UNITED STATES PATENT OFFICE.

HARRIET N. STIMSON, OF LOWELL, MASSACHUSETTS, ADMINISTRATRIX OF THE ESTATE OF LUCIUS S. STIMSON, DECEASED, ASSIGNOR OF ONE-HALF HER RIGHT TO NELSON F. LIBBY, OF SAME PLACE.

IMPROVEMENT IN COMPOSITION FELTINGS.

Specification forming part of Letters Patent No. 119,059, dated September 19, 1871; antedated September 16, 1871.

*To all whom it may concern:*

Be it known that LUCIUS S. STIMSON, late of Lowell, in the county of Middlesex and Commonwealth of Massachusetts, deceased, during his lifetime invented certain new and useful Improvements in Composition Felting, of which the following is a specification:

The said invention relates to that kind of felting which is used in sheathing ships—that is, for a strong packing between the planking and the sheathing-boards to prevent leakage; also, the sheet-felting used for covering the roofs of buildings, and for various other purposes where the exclusion of water or dampness is the result or object desired to be obtained.

The ingredients of which the said improved composition felting is formed are petroleum or other oil, resin or pitch, silica or other fine earthy substance, such as pulverized soap-stone, talc, chalk, coal-cinders, iron-slag, or silica and the common impurities usually found with it, or any other equivalent substance which will serve the purpose, as hereinafter described, and hair or other animal or vegetable fiber, combined together in the following manner, viz.: First, prepare a long sheet, or bat, or lap—say, of hair—in the usual way of making hair felt, or, instead of hair, any kind of suitable vegetable fiber. Next, prepare a composition of oil and resin or pitch, petroleum-oil being preferred. Place in a suitable kettle the desired quantity of oil and resin and apply heat until the resin is dissolved in the oil. After boiling, the composition is tested by dropping a small quantity of the same into cold water. If the composition, upon being removed from the water, will bend without breaking, it is of the proper consistency for use. Next, the lap or bat of previously-prepared hair or vegetable fiber is immersed in or saturated with the heated composition of oil and resin or pitch, and the pulverized substance applied to both sides of the said saturated lap or bat, which, while cooling, is passed several times between pressure-rolls of any common kind to compress the combined substances. Said mineral substance prevents adhesion to the pressure-rolls and renders said felting comparatively fire-proof and entirely impervious to water. The hair or other fibrous substance makes a very strong and tenacious foundation, and the oil and resin or pitch are admirably adapted to hold all the parts together, the composition possessing peculiar properties which render it capable of resisting the action of heat or cold. It is somewhat difficult to give the exact proportions of the oil, resin, or pitch, since oils vary in density, and each different kind or lot of oil will generally dissolve a different quantity of resin or pitch; and if the latter is used a greater quantity of it is soluble in almost any kind of oil than of the former, and, therefore, it is found by dissolving and mixing the resin or pitch with oil until the proper consistency is attained, as herein described, that a mixture is produced best fitted for saturating the said fibrous foundation, and for holding all the parts or ingredients together.

In this invention a composition of petroleum and resin with pulverized soap-stone, as expressed in the patent to Libby & Stimson August 3, 1869, is not claimed; nor is there here claimed the composition of petroleum, resin or pitch, and silica, as in patent No. 99,277, issued to Thomas R. Abbott and dated February 1, 1870. Neither of the above-described compositions is found to possess the necessary properties and qualifications to render it in any sense the equal or equivalent of the composition I have described as the present invention for composition felting.

What I claim as the invention of the said Lucius Stimson is—

A composition felting, as described, the same consisting of a sheet, lap, or bat of animal or vegetable fibers, or their specified equivalent, saturated with a composition of oil and resin or pitch, as set forth, and earthy or mineral substance or silica, all combined substantially in the manner and for the purposes described.

HARRIET N. STIMSON,
*Admx.*

Witnesses:
ABEL T. ATHERTON,
ANN LIBBY.